(12) United States Patent
Eda et al.

(10) Patent No.: US 10,449,634 B2
(45) Date of Patent: Oct. 22, 2019

(54) LASER BUILD-UP METHOD

(71) Applicant: TOYOTA JIDOSHA KABUSHIKI KAISHA, Toyota-shi, Aichi-ken (JP)

(72) Inventors: Akinori Eda, Nagakute (JP); Hideki Teshima, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 564 days.

(21) Appl. No.: 15/168,915

(22) Filed: May 31, 2016

(65) Prior Publication Data

US 2017/0014951 A1 Jan. 19, 2017

(30) Foreign Application Priority Data

Jul. 16, 2015 (JP) .................. 2015-141979

(51) Int. Cl.
| | |
|---|---|
| *B23K 26/342* | (2014.01) |
| *B23K 26/14* | (2014.01) |
| *B23K 26/34* | (2014.01) |
| *F01L 3/04* | (2006.01) |
| *B23K 26/142* | (2014.01) |
| *B23K 26/144* | (2014.01) |
| *B23K 26/146* | (2014.01) |
| *F01L 3/02* | (2006.01) |

(52) U.S. Cl.
CPC .......... *B23K 26/342* (2015.10); *B23K 26/142* (2015.10); *B23K 26/144* (2015.10); *B23K 26/146* (2015.10); *B23K 26/1437* (2015.10); *B23K 26/34* (2013.01); *F01L 3/02* (2013.01); *F01L 3/04* (2013.01); *B23K 26/1462* (2015.10); *F01L 2103/00* (2013.01)

(58) Field of Classification Search
CPC .... F01L 2103/00; F01L 23/02; B23K 26/342; B23K 26/34; B23K 26/146; B23K 26/144
See application file for complete search history.

(56) References Cited

U.S. PATENT DOCUMENTS

| | | | | |
|---|---|---|---|---|
| 5,609,781 A | * | 3/1997 | Kaga .................... | B23K 26/032 219/121.67 |
| 2009/0151163 A1 | * | 6/2009 | Kawasaki .............. | B23K 35/30 29/888.06 |

(Continued)

FOREIGN PATENT DOCUMENTS

| | | | | |
|---|---|---|---|---|
| JP | 2010-201480 A | | 9/2010 | |
| JP | 2010201480 A | * | 9/2010 | ............. B23K 26/00 |

(Continued)

*Primary Examiner* — Ibrahime A Abraham
*Assistant Examiner* — Ahmad Abdel-Rahman
(74) *Attorney, Agent, or Firm* — Oliff PLC

(57) ABSTRACT

A laser build-up method according to an embodiment includes the processes of: forming an annular counter sunk groove 15 in an edge of an opening of a port on a side of a combustion chamber; and irradiating a laser beam 30 while a metallic powder 26 is being supplied to the counter sunk groove 15 and successively forming a cladding layer 16 for a valve seat, in which: the cladding layer 16 is formed while a seal gas 24 is being sprayed onto a melt pool 31, the cladding layer 16 includes a starting end part 17a, a part formed just after the starting end part is formed 18a, an intermediate part 18b, a part formed just before a terminating end part is formed 18c, and a terminating end part 17b, which are formed in this order.

6 Claims, 13 Drawing Sheets

(56) References Cited

U.S. PATENT DOCUMENTS

| | | | |
|---|---|---|---|
| 2012/0145683 A1* | 6/2012 | Miyagi | B23K 26/147 |
| | | | 219/121.64 |
| 2016/0136758 A1 | 5/2016 | Kawasaki et al. | |
| 2017/0312855 A1* | 11/2017 | Hooper | C23C 14/28 |

FOREIGN PATENT DOCUMENTS

| | | | |
|---|---|---|---|
| JP | 2010201480 A | * | 9/2010 |
| JP | 2015-009268 A | | 1/2015 |

\* cited by examiner

LASER BUILD-UP METHOD

INCORPORATION BY REFERENCE

This application is based upon and claims the benefit of priority from Japanese patent application No. 2015-141979, filed on Jul. 16, 2015, the disclosure of which is incorporated herein in its entirety by reference.

BACKGROUND OF THE INVENTION

1. Field of the Invention The present invention relates to a laser build-up method and relates to, for example, a laser build-up method for a valve seat.

2. Description of Related Art

It is required for a valve seat of a cylinder head which a valve repeatedly contacts under a high-temperature environment to have a high heat resistance and a high wear resistance. Therefore, the valve seat is obtained by forming an annular counter sunk groove by machine processing on an edge of an opening end of an inlet/outlet port of a cylinder head roughly formed material and forming a cladding layer made of copper-based alloy or the like in the counter sunk groove.

As the build-up method for the valve seat, a laser build-up method (a so-called laser cladding method) that irradiates a laser beam while a metallic powder is being supplied to a counter sunk groove to form a cladding layer is known. It is known in this laser build-up method that blow holes tend to occur in an overlapped part in which a starting end part and a terminating end part of the cladding layer overlap each other.

In order to reduce the blow holes, Japanese Unexamined Patent Application Publication No. 2010-201480 discloses a laser build-up method in which an output of a laser is increased to a predetermined amount, the terminating end part of the cladding layer is then formed, and the terminating end part is overlapped with the starting end part.

The present inventors have found that blow holes are generated in the overlapped part when the state of excess metallic powder (excess powder) deposited in the starting end part of the cladding layer becomes a semi-molten one since a laser beam comes close to it, the excess metallic powder becomes balls, and then the balls are absorbed in a melt pool. Even when the output of the laser is increased in the overlapped part as disclosed in the method disclosed in Japanese Unexamined Patent Application Publication No. 2010-201480, it is impossible to decrease an excess powder, which causes the occurrence of the blow holes in the overlapped part.

The present inventors have found that it is possible to suppress the occurrence of the blow holes by increasing the flow rate of the seal gas sprayed onto the melt pool and removing the excess powder deposited in the starting end part.

However, the simple increase in the flow rate of the seal gas results in a decrease in the yield of the metallic powder.

The present invention has been made in order to solve the aforementioned problem and aims to provide a laser build-up method capable of improving the yield of the metallic powder while suppressing the occurrence of the blow holes in the overlapped part.

SUMMARY OF THE INVENTION

A laser build-up method according to an embodiment of the present invention includes the processes of: forming an annular counter sunk groove in an edge of an opening of a port on a side of a combustion chamber in a cylinder head roughly formed material; and irradiating a laser beam while a metallic powder is being supplied to the counter sunk groove and successively forming a cladding layer for a valve seat, in which: the cladding layer is formed while seal gas is being sprayed onto a melt pool, the cladding layer includes a starting end part, a part formed just after the starting end part is formed, an intermediate part, a part formed just before a terminating end part is formed, and a terminating end part, which are formed in this order, and the cladding layer is successively formed in an annular shape, and the flow rate of the seal gas when an overlapped part in which the terminating end part overlaps with the starting end part is formed is made larger than the flow rate of the seal gas when the intermediate part is formed.

According to this structure, it is possible to remove the excess powder deposited in the starting end part and to suppress the occurrence of the blow holes in the overlapped part. On the other hand, since the flow rate of the seal gas when the intermediate part is formed is suppressed, it is possible to improve the yield of the metallic powder. That is, it is possible to improve the yield of the metallic powder while suppressing the occurrence of the blow holes in the overlapped part.

The flow rate of the seal gas when the part formed just before the terminating end part is formed is formed is preferably made larger than the flow rate of the seal gas when the intermediate part is formed. It is possible to further suppress the occurrence of the blow holes in the overlapped part.

Further, the flow rate of the seal gas when the starting end part is formed is preferably made larger than the flow rate of the seal gas when the intermediate part is formed. It is possible to further suppress the occurrence of the blow holes in the overlapped part.

Further, the flow rate of the seal gas when the part formed just after the starting end part is formed is formed is preferably made larger than the flow rate of the seal gas when the intermediate part is formed. It is possible to further suppress the occurrence of the blow holes in the overlapped part.

Further, in the process of forming the counter sunk groove, it is preferable that the counter sunk groove be formed by inclining a bottom surface so that the angle of the bottom surface of the counter sunk groove and an inner peripheral surface of the port becomes larger than 90°; and the cladding layer be successively formed by making a central axis of the counter sunk groove coincide with a vertical direction.

According to this structure, the excess powder is hardly deposited on the bottom surface. Further, after the excess powder becomes a ball, this ball is easily dropped into the port. It is therefore possible to suppress the occurrence of the blow holes.

According to the present invention, it is possible to provide a laser build-up method capable of improving the yield of the metallic powder while suppressing the occurrence of the blow holes in the overlapped part.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, with reference to the drawings, embodiments of the present invention will be described. However, the present invention is not limited to the following embodiments. For the clarification of the description, the following description and the drawings are simplified as appropriate.

First Embodiment

A laser build-up method according to a first embodiment will be described.

Figure 1:
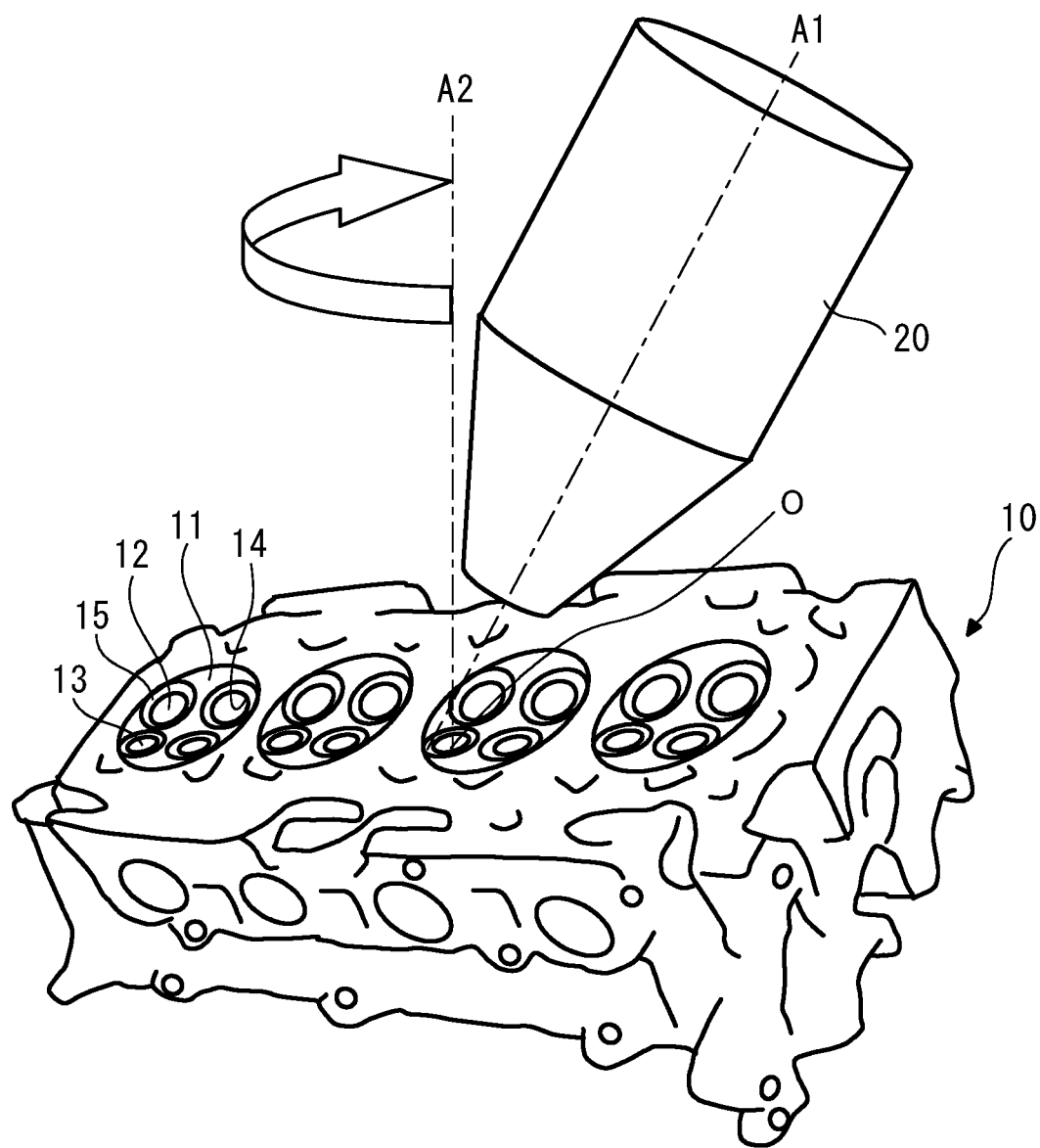
FIG. 1 is a perspective view schematically showing an outline of a laser build-up method according to a first embodiment.

FIG. 1 is a perspective view schematically showing an outline of the laser build-up method according to the first embodiment.

Figure 2:
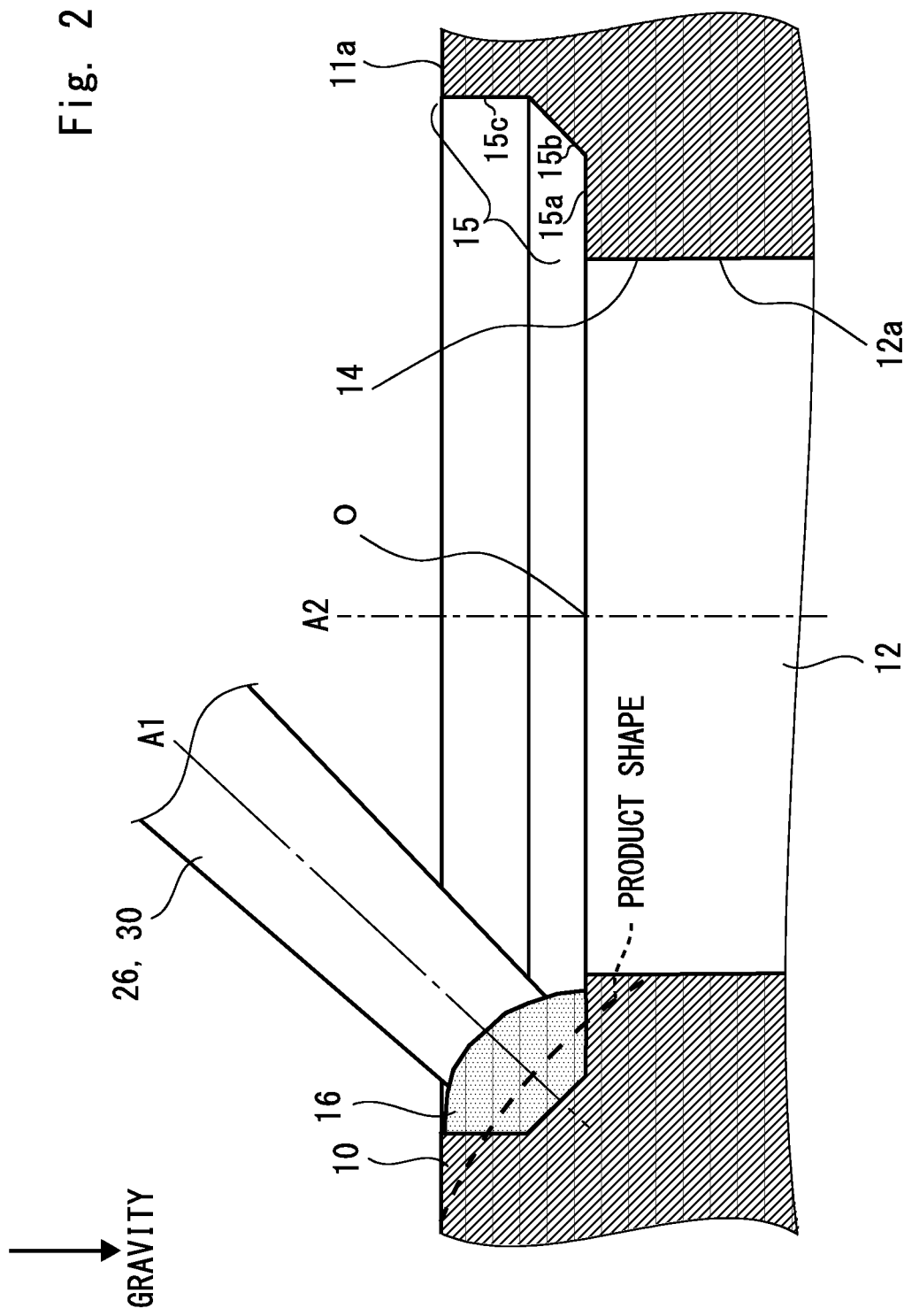
FIG. 2 is a cross-sectional view schematically showing the outline of the laser build-up method according to the first embodiment.

FIG. 2 is a cross-sectional view schematically showing the outline of the laser build-up method according to the first embodiment.

With reference to FIGS. 1 and 2, the outline of the laser build-up method according to the first embodiment will be described. First, a configuration of a cylinder head roughly formed material 10 will be described. The cylinder head roughly formed material 10 is casting formed of, for example, cast iron or aluminum alloy. The cylinder head roughly formed material 10 includes a plurality of combustion chambers 11. Each of the combustion chambers 11 includes an inlet port 12 and an outlet port 13.

In the above cylinder head roughly formed material 10, an annular counter sunk groove 15 is formed to surround an opening 14 at an edge of the opening 14 on the side of the combustion chamber 11 of the inlet port 12 and the outlet port 13. The counter sunk groove 15 is formed by machine processing. The counter sunk groove 15 is formed, for example, to include a bottom surface 15a, an oblique surface 15b, and a side surface 15c. The bottom surface 15a, the oblique surface 15b, and the side surface 15c also have annular shapes. The oblique surface 15b is provided between the bottom surface 15a and the side surface 15c. Therefore, the bottom surface 15a is adjacent to an inner peripheral surface 12a of the inlet port 12 and is also adjacent to the oblique surface 15b. The side surface 15c is adjacent to an inner surface 11a of the combustion chamber 11 and is also adjacent to the oblique surface 15b. The oblique surface 15b is adjacent to the bottom surface 15a and is also adjacent to the side surface 15c.

The cylinder head roughly formed material 10 shown in FIG. 1 is for 4-cylinder, 16-valve engines and includes two inlet ports 12 and two outlet ports 13 in each of the four combustion chambers 11. As a matter of course, the number of combustion chambers 11, the number of inlet ports 12, and the number of outlet ports 13 are not limited to those shown in the example of FIG. 1 and are determined as appropriate.

As shown in FIGS. 1 and 2, a laser beam 30 (optical axis A1) is irradiated while a metallic powder 26 is being supplied to the counter sunk groove 15 from a laser processing head 20. The metallic powder 26 is melted and solidified inside the counter sunk groove 15 and a cladding layer 16 for the valve seat is successively formed. The laser processing head 20 is rotated about a central axis A2 of the annular counter sunk groove 15. In this way, the laser beam 30 and the metallic powder 26 discharged from the laser processing head 20 are supplied in an annular shape along the counter sunk groove 15. In this way, the cladding layer 16 is formed along the full circumference of the counter sunk groove 15.

The central axis A2 will be defined as follows. The center of the circle formed by the annular shape of the counter sunk groove 15 is denoted by a center O. The central axis A2 is an axis that is vertical to two diameters that are perpendicular to each other in the circle and passes through the center O. The center O is substantially the same as the center of the opening 14. When the cladding layer 16 is formed, the central axis A2 is made to coincide with the vertical direction with the side of the combustion chamber 11 upwards so that the opening 14 faces upward. While the inlet port 12 is shown in FIG. 2, the outlet port 13 may be used instead of the inlet port 12. The surface of the cladding layer 16 is grinded to obtain a product shape.

Figure 3:
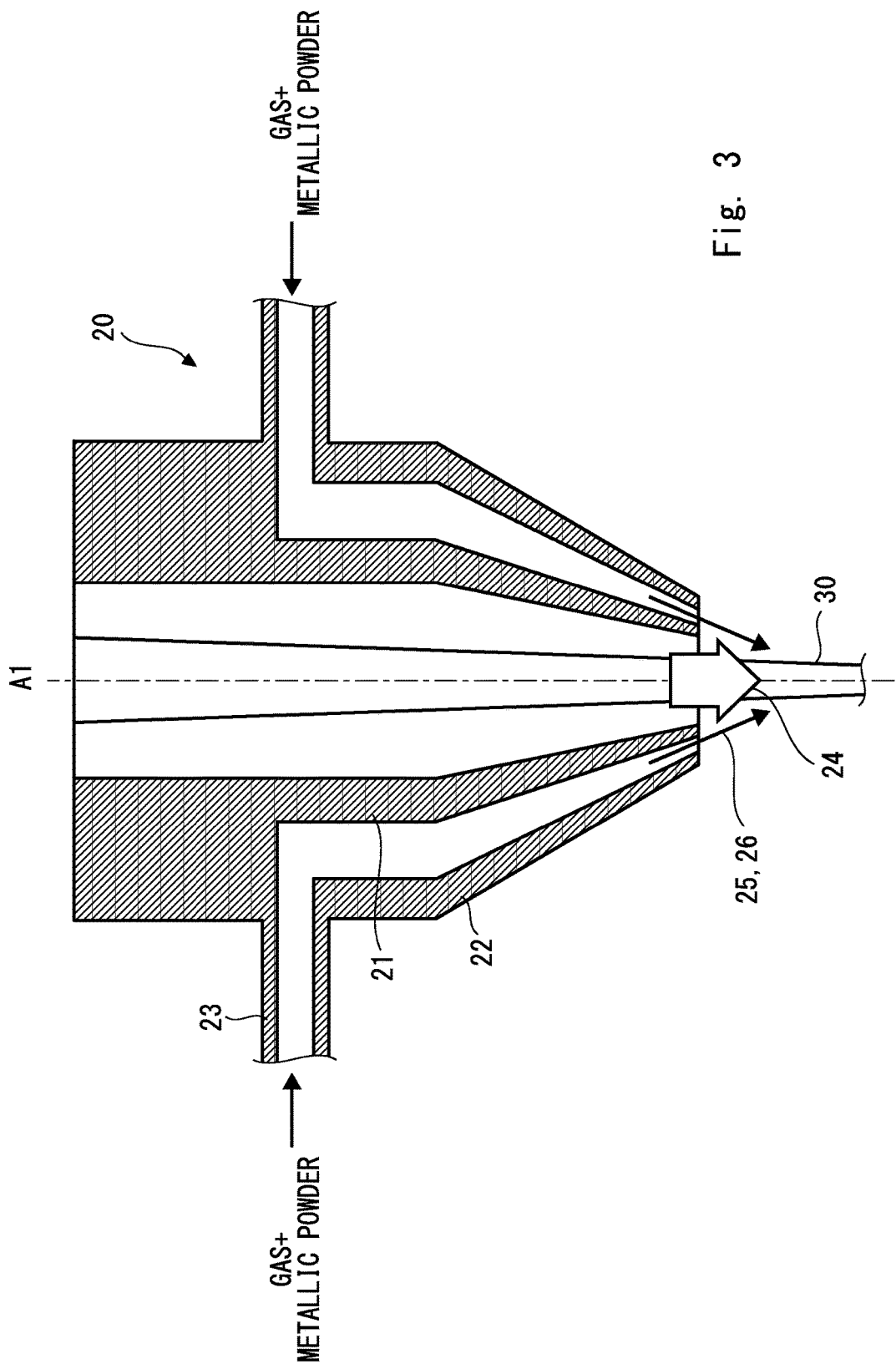
FIG. 3 is a cross-sectional view that exemplifies a laser processing head according to the first embodiment.

FIG. 3 is a cross-sectional view that exemplifies the laser processing head according to the first embodiment.

With reference to FIG. 3, the laser processing head 20 used in the laser build-up method will be described. The laser processing head 20 includes an inner nozzle 21, an outer nozzle 22, and a raw material supply pipe 23. Specifically, the laser processing head 20 has a coaxial double-tube structure including the inner nozzle 21 and the outer nozzle 22 both having an optical axis A1 of the laser beam 30 as a central axis.

Specifically, the laser beam 30 is emitted from the inner nozzle 21. Further, a seal gas 24 is discharged from the inner nozzle 21. A carrier gas 25 and a metallic powder 26 supplied via the raw material supply pipe 23 are discharged from a part between the inner nozzle 21 and the outer nozzle 22. That is, the discharge axis of the seal gas 24, the carrier gas 25, and the metallic powder 26 is coaxial to the optical axis A1 of the laser beam 30.

The seal gas 24 and the carrier gas 25 are, for example, each an inactive gas such as argon gas or nitrogen gas. By integrating the functions of irradiating the laser beam 30 and supplying the seal gas 24, the carrier gas 25, and the metallic powder 26, the size of the laser processing apparatus can be reduced. In FIG. 1, the raw material supply pipe 23 is not shown.

Figure 4:
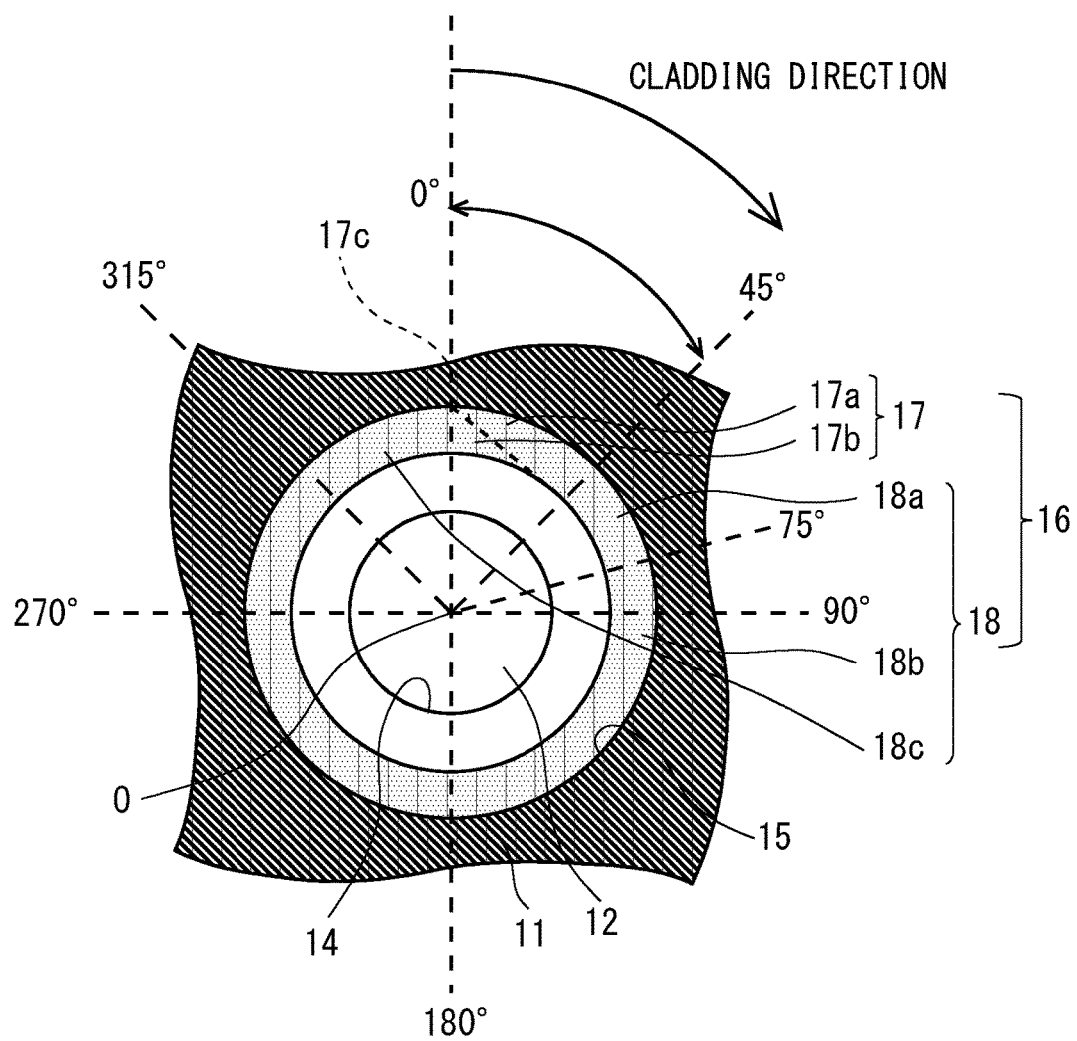
FIG. 4 is a diagram that exemplifies a cladding layer formed by the laser build-up method according to the first embodiment when the cladding layer is seen from a side of a combustion chamber.

FIG. 4 is the cladding layer formed by the laser build-up method according to the first embodiment and exemplifies the cladding layer seen from the side of the combustion chamber.

With reference to FIG. 4, the cladding layer 16 formed by the laser build-up method will be described. The cladding layer 16 seen from the side of the combustion chamber 11 is formed to have an annular shape to surround the opening 14 on the periphery of the opening 14 of the inlet port 12. The cladding layer 16 is formed inside the counter sunk groove 15. The central axis (not shown) of the counter sunk groove 15 is perpendicular to the paper of FIG. 4. The cladding layer 16 is used as the valve seat of the cylinder head which the valve repeatedly touches under a high-temperature environment.

The cladding layer 16 includes an overlapped part 17 and a non-overlapped part 18. First, the overlapped part 17 will be described. The part which is the starting point when the cladding layer 16 is formed is set to 0°. The clockwise direction with the center O is defined as a cladding direction. In the annular cladding layer 16, the part between 0° and 45° in the cladding direction is denoted by the overlapped part 17. The overlapped part 17 includes a starting end part 17a and a terminating end part 17b. In the overlapped part 17, the starting end part 17a and the terminating end part 17b overlap each other. The oblique line 17c in FIG. 4 shows that the starting end part 17a and the terminating end part 17b overlap each other. Note that the oblique line 17c is not actually formed.

The starting end part 17a is a part that is formed first when the cladding layer 16 is formed. The starting end part 17a is, for example, a part between 0° and 45°.

The terminating end part 17b is a part that is formed last when the cladding layer 16 is formed. The terminating end part 17b is formed on the starting end part 17a so as to overlap the starting end part 17a.

Next, the non-overlapped part 18 will be described. The non-overlapped part 18 is the part other than the overlapped part 17 in the cladding layer 16. The non-overlapped part 18 is, for example, a part between 45° and 360° in the annular cladding layer 16. The non-overlapped part 18 includes a part formed just after the starting end part is formed 18a, an intermediate part 18b, and a part formed just before the terminating end part is formed 18c.

The part formed just after the starting end part is formed 18a is a part that is formed immediately after the starting end part 17a is formed. The part formed just after the starting end part is formed 18a is a part between the starting end part 17a and the intermediate part 18b. The part formed just after the starting end part is formed 18a is, for example, a part having an angle of 30°. In FIG. 4, when the starting end part 17a is a part between 0° and 45°, the part formed just after the starting end part is formed 18a is a part between 45° and 75°.

The intermediate part 18b is a part formed immediately after the part formed just after the starting end part is formed 18a is formed. The intermediate part 18b is a part between the part formed just after the starting end part is formed 18a and the part formed just before the terminating end part is formed 18c. The intermediate part 18b is, for example, a part having an angle of 240°. In FIG. 4, when the starting end part 17a is a part between 0° and 45° and the part formed just after the starting end part is formed 18a is a part between 45° and 75°, the intermediate part 18b is a part between 75° and 315°.

The part formed just before the terminating end part is formed 18c is a part formed immediately after the intermediate part 18b is formed. Further, the part formed just before the terminating end part is formed 18c is a part formed immediately before the terminating end part 17b is formed. The part formed just before the terminating end part is formed 18c is a part between the intermediate part 18b and the terminating end part 17b. The part formed just before the terminating end part is formed 18c is, for example, a part having an angle of 45°. In FIG. 4, the part formed just before the terminating end part is formed 18c is a part between 315° and 360°.

Figure 5:
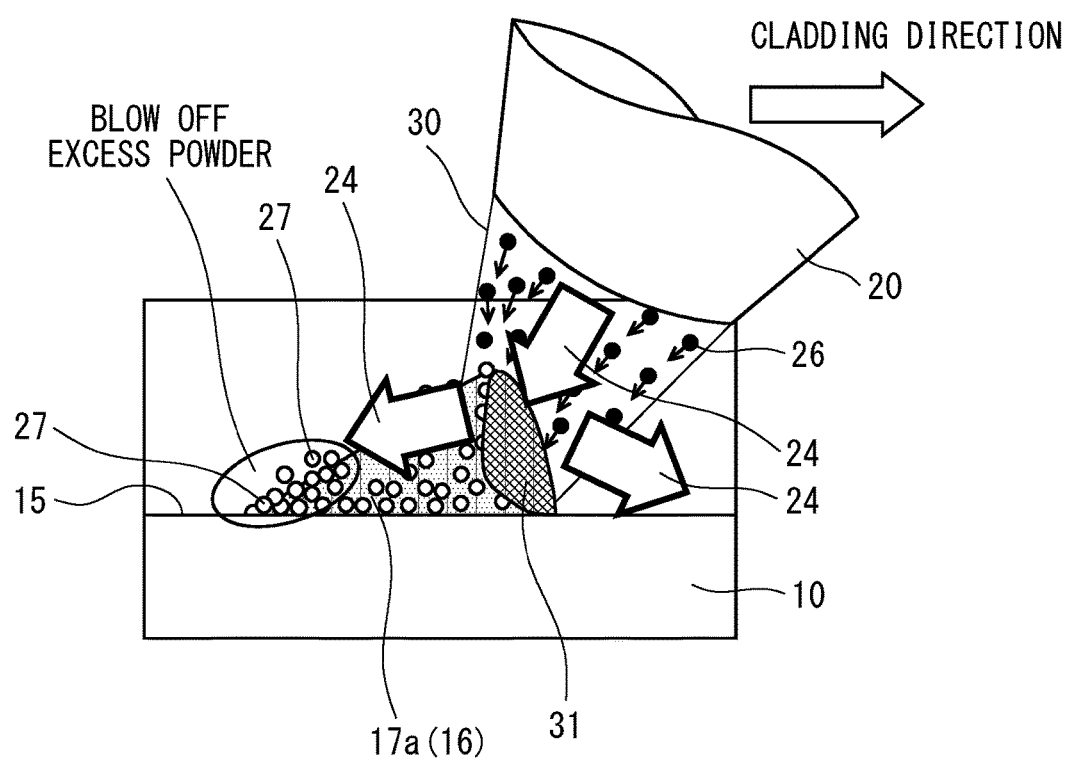
FIG. 5 is a diagram that exemplifies formation of a starting end part in the laser build-up method according to the first embodiment.

FIG. 5 is a diagram that exemplifies formation of the starting end part in the laser build-up method according to the first embodiment.

With reference to FIG. 5, the method of forming the cladding layer 16 will be described in detail. First, the starting end part 17a is formed from the part which is the starting point in the counter sunk groove 15. When the starting end part 17a is formed, the timing when the metallic powder 26 is discharged and the timing when the laser beam 30 is irradiated are adjusted. When the supplying of the metallic powder 26 is late, alloying of the metallic powder 26 and the cylinder head roughly formed material 10 advances. On the other hand, when the supplying of the metallic powder 26 is early, balls made of the metallic powder or a residual powder are generated. The starting end part 17a is formed by adjusting the timing of the supplying of the metallic powder 26.

As the formation of the starting end part 17a advances, the thickness of the cladding layer 16 gradually increases. A melt pool 31 is formed on the surface of the cladding layer 16 that is opposed to the laser processing head 20. The melt pool 31 is made of the metallic powder 26 that is melt by the irradiation of the laser beam 30. The metallic powder 26 is discharged toward the melt pool 31. Further, the laser beam 30 is irradiated to the melt pool 31. Further, the cladding layer 16 is formed while the seal gas 24 is being sprayed onto the melt pool 31. The melt pool 31 is moved in the cladding direction while keeping the melt pool 31. The cladding layer 16 in which the melt pool 31 is solidified is formed on the path in which the melt pool 31 is moved.

In this way, by moving the melt pool 31 in the cladding direction, the cladding layer 16 is grown in the cladding direction. An excess powder 27 of the metallic powder 26 occurs on the side opposite to the cladding direction when seen from the melt pool 31. When the starting end part 17a is formed, the flow rate of the seal gas 24 is made larger than the flow rate of the seal gas 24 when the intermediate part 18b is formed. The seal gas 24 is originally provided to prevent oxidation of the melt pool 31 or to protect an exit glass of the laser beam 30. In this embodiment, the seal gas 24 is used also to blow off the excess powder 27.

Figure 6:
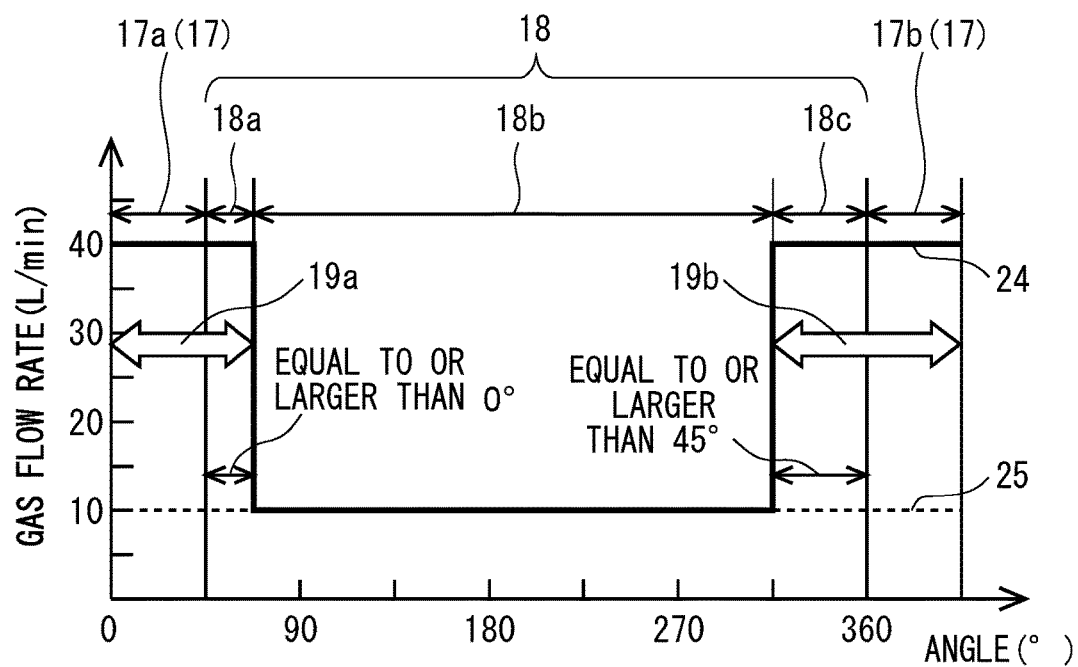
FIG. 6 is a graph that exemplifies changes in a gas flow rate in the laser build-up method according to the first embodiment, with a horizontal axis indicating an angle showing the position where the cladding layer is formed and a vertical axis indicating a gas flow rate.

FIG. 6 is a graph that exemplifies changes in the gas flow rate in the laser build-up method according to the first embodiment, with the horizontal axis indicating the angle of the part where the cladding layer is formed and the vertical axis indicating the gas flow rate. The gas flow rate shows the flow rate (solid line) of the seal gas 24 and the flow rate (dotted line) of the carrier gas 25. The solid line that indicates the flow rate of the seal gas 24 partially overlaps with the dotted line that indicates the carrier gas 25.

As shown in FIG. 6, the flow rate of the seal gas 24 when the starting end part 17a is formed is made larger than the flow rate of the seal gas 24 when the intermediate part 18b is formed. For example, when the starting end part 17a between 0° and 45° is formed, the flow rate of the seal gas 24 is set to 40 L/min. The output of the laser beam 30 is 2.8 kW. The processing speed is 700 mm/min. The amount of metallic powder supplied is 0.75 g/s. The flow rate of the carrier gas 25 is 10 L/min. It is therefore possible to blow off the excess powder 27 and to suppress the occurrence of the blow holes in the overlapped part 17.

As shown in FIG. 6, after the starting end part 17a is formed, the part formed just after the starting end part is formed 18a is formed. The part formed just after the starting end part is formed 18a is, for example, a part between 45° and 75°. When the part formed just after the starting end part is formed 18a is formed, the flow rate of the seal gas 24 may be kept to 40 L/min. That is, the flow rate of the seal gas when the part formed just after the starting end part is formed 18a is formed is set to the flow rate the same as the flow rate of the seal gas when the starting end part 17a is formed. That is, the flow rate of the seal gas when the part formed just after the starting end part is formed 18a is formed may be made larger than the flow rate when the intermediate part 18b is formed. It is therefore possible to blow off the excess powder 27 attached onto the surfaces of the overlapped part 17 and the non-overlapped part 18 and to suppress the occurrence of the blow holes in the overlapped part 17 and the non-overlapped part 18.

The period when the starting end part 17a and the part formed just after the starting end part is formed 18a are formed is denoted by a first removal timing 19a. In the first removal timing 19a, the excess powder 27 that is generated is removed by increasing the flow rate of the seal gas 24.

The first removal timing 19a may indicate the period in which only the starting end part 17a is formed. That is, the flow rate of the seal gas 24 in the part formed just after the starting end part is formed 18a may be decreased to the flow rate of the seal gas 24 in the intermediate part 18b. In this case, the yield of the metallic powder 26 may be improved. However, as regards the suppression of the occurrence of the blow holes, it is more preferable to keep increasing the flow rate of the seal gas 24 also in the period in which the part formed just after the starting end part is formed 18a is formed.

After the first removal timing 19a, that is, after the starting end part 17a and the part formed just after the starting end part is formed 18a are formed, the intermediate part 18b is formed. The intermediate part 18b is a part between 75° and 315°. In the intermediate part 18b, the flow rate of the seal gas 24 is decreased. The flow rate of the seal gas 24 when the intermediate part 18b is formed is set to the flow rate the same as the flow rate of the carrier gas 25 to supply the metallic powder 26. The flow rate of the seal gas 24 is decreased, for example, to 10 L/min. It is therefore possible to improve the yield of the metallic powder 26. The conditions other than the flow rate of the seal gas 24 (i.e., the output of the laser beam 30, the processing speed, the amount of the metallic powder 26, and the flow rate of the carrier gas 25) are the same as those described above.

The second timing when the excess powder 27 is generated is when the part formed just before the terminating end part is formed 18c and the terminating end part 17b are formed. The period in which the part formed just before the terminating end part is formed 18c and the terminating end part 17b are formed is denoted by a second removal timing 19b.

The second removal timing 19b may indicate the period in which only the terminating end part 17b is formed. That is, the flow rate of the seal gas 24 in the part formed just before the terminating end part is formed 18c may be kept to the flow rate of the seal gas 24 in the intermediate part 18b. In this case, the yield of the metallic powder 26 can be improved. However, as regards the suppression of the occurrence of the blow holes, it is preferable to increase the flow rate of the seal gas 24 also in the period in which the part formed just before the terminating end part is formed 18c is formed.

Figure 7:
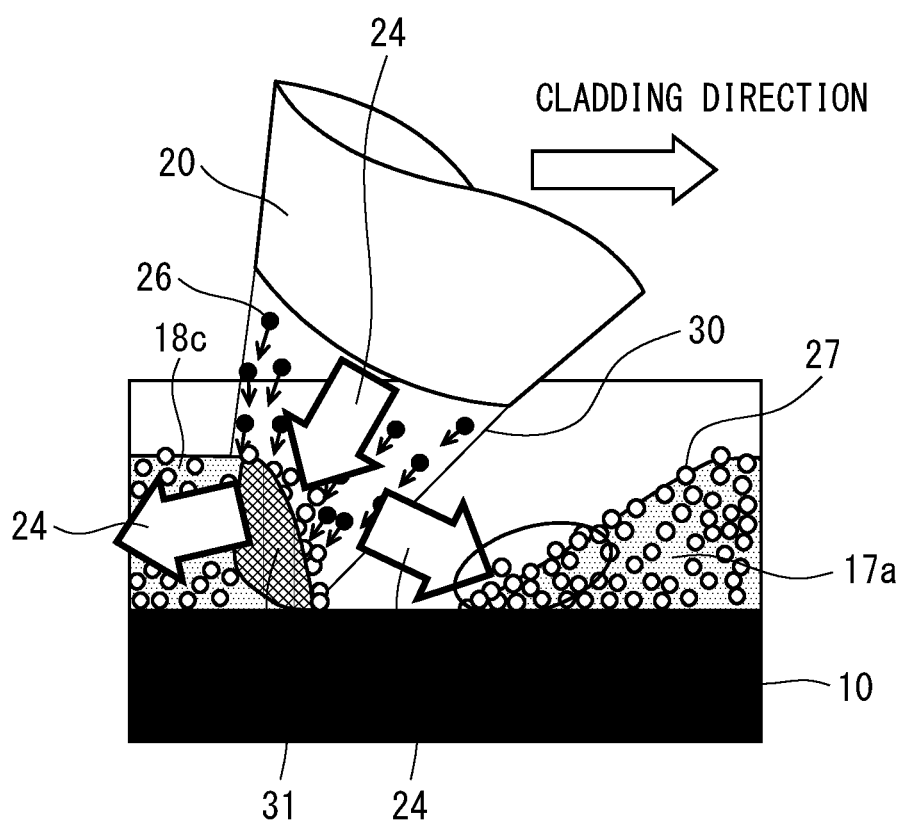
FIG. 7 is a diagram that exemplifies formation of a part formed just before a terminating end part is formed in the laser build-up method according to the first embodiment.

FIG. 7 is a diagram that exemplifies formation of the part formed just before the terminating end part is formed in the laser build-up method according to the first embodiment.

As shown in FIGS. 6 and 7, the part formed just before the terminating end part is formed 18c is formed. The part formed just before the terminating end part is formed 18c is, for example, a part between 315° and 360°. When the part formed just before the terminating end part is formed 18c is formed, the laser processing head 20 approaches the starting end part 17a. In the starting end part 17a, the excess powder 27 including a scattered powder that has been sputtered is deposited.

When the part formed just before the terminating end part is formed 18c is formed, the flow rate of the seal gas 24 is increased again. For example, the flow rate of the seal gas 24 is increased to 40 L/min. That is, the flow rate of the seal gas 24 when the part formed just before the terminating end part is formed 18c is formed is made larger than the flow rate of the seal gas 24 when the intermediate part 18b is formed. It is therefore possible to blow off the excess powder 27 deposited in the starting end part 17a and to suppress the occurrence of the blow holes in the overlapped part 17. The part formed just before the terminating end part is formed 18c is grown in the cladding direction while maintaining the melt pool 31.

As shown in FIG. 6, the terminating end part 17b is formed after the part formed just before the terminating end part is formed 18c is formed. The terminating end part 17b is, for example, a part between 360° and 405°. That is, the terminating end part 17b overlaps with the starting end part 17a which is a part between 0° and 45°. When the terminating end part 17b is formed, the flow rate of the seal gas 24 is kept to 40 L/min. That is, the flow rate of the seal gas 24 when the terminating end part 17b is formed is set to the flow rate the same as the flow rate when the part formed just before the terminating end part is formed 18c is formed. That is, the flow rate of the seal gas 24 when the terminating end part 17b is formed is made larger than the flow rate of the seal gas 24 when the intermediate part 18b is formed. According to such a configuration, it is possible to remove the excess powder 27 that is deposited in the starting end part 17a and to suppress the occurrence of the blow holes in the overlapped part 17. Further, since the flow rate of the seal gas 24 when the intermediate part 18b is formed is suppressed, it is possible to improve the yield of the metallic powder 26. That is, it is possible to improve the yield of the metallic powder 26 while suppressing the occurrence of the blow holes in the overlapped part 17.

On the other hand, the other conditions (i.e., the output of the laser beam, the processing speed, the amount of metallic powder supplied, and the flow rate of the carrier gas 25) are the same as those stated above. These conditions other than the seal gas 24 are constant in the process of forming the cladding layer 16. It is therefore possible to improve the quality of the cladding layer 16. When the overlapped part 17 is formed, the formation of the cladding layer 16 is ended.

As stated above, in this embodiment, the starting end part 17a, the part formed just after the starting end part is formed 18a, the intermediate part 18b, the part formed just before the terminating end part is formed 18c, and the terminating end part 17b are successively formed in this order in a continuous annular configuration. By overlapping the terminating end part 17b on the starting end part 17a, the cladding layer 16 is formed to have an annular form. The flow rate of the seal gas 24 when the overlapped part in which the terminating end part 17b overlaps with the starting end part 17a is formed is made larger than the flow rate of the seal gas 24 when the intermediate part 18b is formed.

With reference to FIG. 7, the mechanisms of the occurrence of the excess powder 27 and the suppression of the blow holes in this embodiment will be described. The excess powder 27 deposited in the starting end part 17a and the excess powder 27 deposited in the counter sunk groove 15 (before the starting end part 17a) in the direction opposite to the cladding direction with respect to the starting end part 17a become balls when the terminating end part 17b is formed and are absorbed in the melt pool 31. The blow holes are thus generated in the overlapped part 17, as described above. The excess powder 27, which causes the blow holes in the overlapped part 17, is generated at the following two timings: (i) when the starting end part 17a is formed, and (ii) when the excess powder 27 that is blown off when the non-overlapped part 18 is formed is deposited before the starting end part 17a. In this embodiment, the excess powder 27 described in (i) and (ii) is removed by increasing the flow rate of the seal gas 24.

When the flow rate of the seal gas 24 is 10 L/min, it is difficult to remove the excess powder 27. However, when the flow rate of the seal gas 24 is doubled (20 L/min), the effect of removing the excess powder 27 is exhibited. It has been confirmed that the above effect becomes larger as the flow rate of the seal gas 24 increases. In the first removal timing 19a and the second removal timing 19b corresponding to the timings (i) and (ii) when the excess powder 27 is generated, the flow rate of the seal gas 24 is increased. In the second removal timing 19b, it is required to blow off the excess powder 27 that exists before the starting end part 17a. Therefore, the flow rate of the seal gas 24 starts to increase before the starting end part 17a (−45° or larger). That is, the part formed just before the terminating end part is formed 18c is made to have an angle equal to or larger than 45° in the annular cladding layer 16.

As described above, in order to suppress the defects such as the blow holes and non-deposition of the cladding layer 16 in the laser build-up method, the excess powder 27, which causes the defects or the non-deposition, is blown off. To blow off the excess powder 27, the flow rate of the seal gas 24 is increased. At this time, the yield of the metallic powder 26 is decreased. Therefore, the amount of the seal gas 24 in the starting end part 17a and the terminating end part 17b in which defects and non-deposition tend to occur is particularly increased.

In the laser build-up method according to this embodiment, the flow rate of the seal gas 24 when the overlapped part 17 is formed is made larger than the flow rate of the seal gas 24 when the intermediate part 18b is formed. It is therefore possible to improve the yield of the metallic powder while suppressing the occurrence of the blow holes in the overlapped part 17.

Now, in order to explain other effects of the first embodiment, the laser build-up method disclosed in Japanese Unexamined Patent Application Publication No. 2010-201480 is described as a comparative example.

Figure 8:
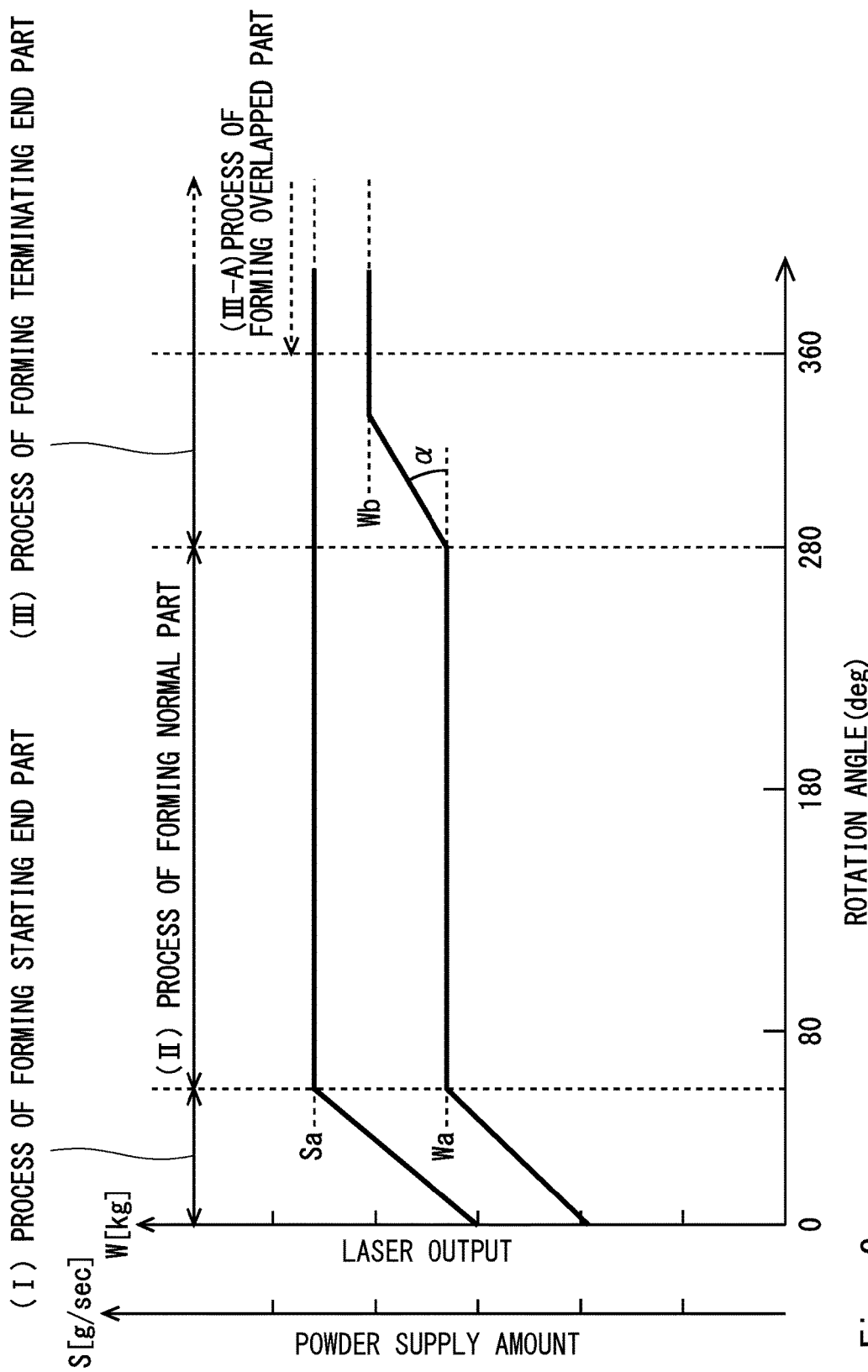
FIG. 8 is a graph that exemplifies processing conditions in a laser build-up method according to a comparative example, with a horizontal axis indicating an angle and a vertical axis indicating a laser output and a powder supply amount.

FIG. 8 is a graph that exemplifies processing conditions in the laser build-up method according to the comparative example, with the horizontal axis indicating the rotation angle and the vertical axis indicating the laser output and the powder supply amount.

As shown in FIG. 8, in the comparative example, since the excess powder that exists before the starting end part of the overlapped part causes defects or non-deposition, the laser output is increased from an output Wa to an output Wb while keeping a powder supply amount Sa constant from a process of forming the terminating end part (III) before the starting end part (see FIG. 3 of Japanese Unexamined Patent Application Publication No. 2010-201480). As described above, in the comparative example, the laser output is increased and then the overlapped part is formed, whereby the energy that is sufficient to solve the excess powder is given and defects and non-deposition are thus suppressed.

In the comparative example, the laser output needs to be increased, which causes an increase in the size of the laser oscillator and an increase in the cost of the laser oscillator. Further, since the amount of deposition of the excess powder is not constant, when the amount of deposition is small, an increase in the laser output causes an excessive amount of energy to be generated. As a result, the amount of aluminum base metal melted into the cladding layer increases. This causes hardening of the cladding layer and cracking of the cladding layer. Furthermore, although the real cause of the occurrence of the blow holes is the excess powder, the comparative example does not deal with the excess powder.

Unlike the comparative example, in the first embodiment, there is no need to increase the output of the laser beam 30 when the terminating end part 17b is formed. It is therefore possible to reduce the cost without increasing the size of the laser oscillator. Further, since the output of the laser beam 30 does not increase, the amount of aluminium in the cylinder head roughly formed material 10 melted into the cladding layer 16 does not increase. Therefore, the cladding layer 16 does not become hardened and does not crack. Further, since the excess powder 27, which is the real cause of the blow holes, is blown off, the occurrence of the blow holes can be suppressed.

Modified Example of First Embodiment

Next, a modified example in which the flow rate in the intermediate part 18b is increased will be described.

Figure 9:
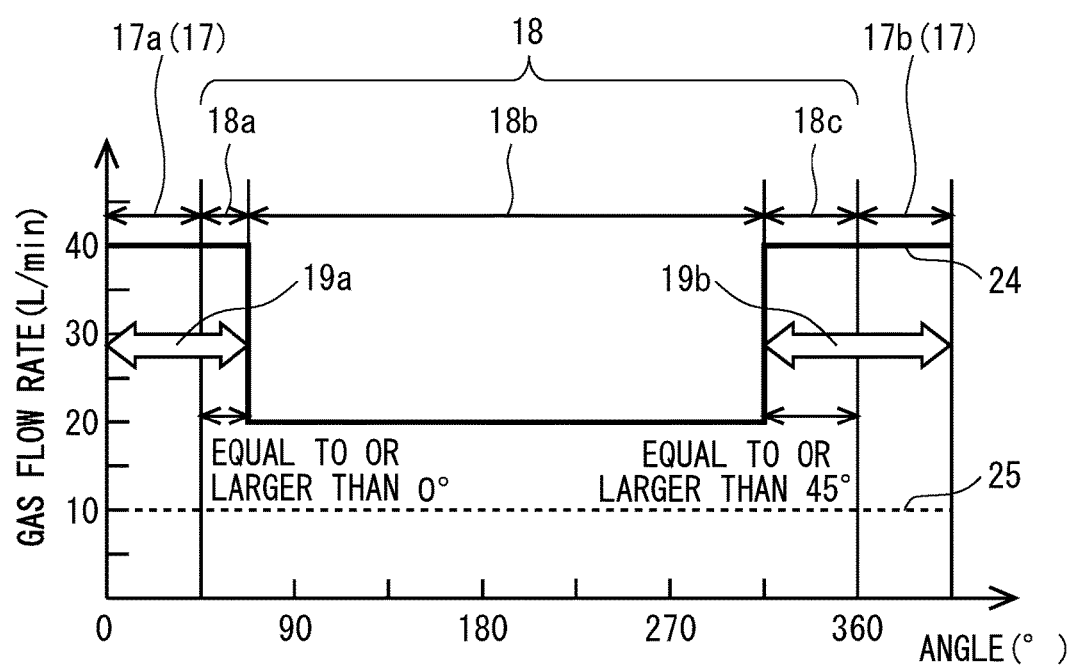
FIG. 9 is a graph that exemplifies changes in a gas flow rate in a laser build-up method according to a modified example of the first embodiment, with a horizontal axis indicating an angle showing the position where a cladding layer is formed and a vertical axis indicating a gas flow rate.

FIG. 9 is a graph that exemplifies changes in the gas flow rate in the laser build-up method according to the modified example of the first embodiment, with the horizontal axis indicating the angle of the part where the cladding layer is formed and the vertical axis indicating the gas flow rate.

As shown in FIG. 9, in the modified example of the first embodiment, the flow rate (solid line) of the seal gas 24 in the intermediate part 18b is increased to 20 L/min from 10 L/min in the first embodiment. Therefore, the flow rate of the seal gas 24 when the intermediate part 18b is formed is made larger than the flow rate of the carrier gas 25 to supply the metallic powder 26. The conditions other than this one are set to the same conditions as those in the first embodiment.

Figure 10:
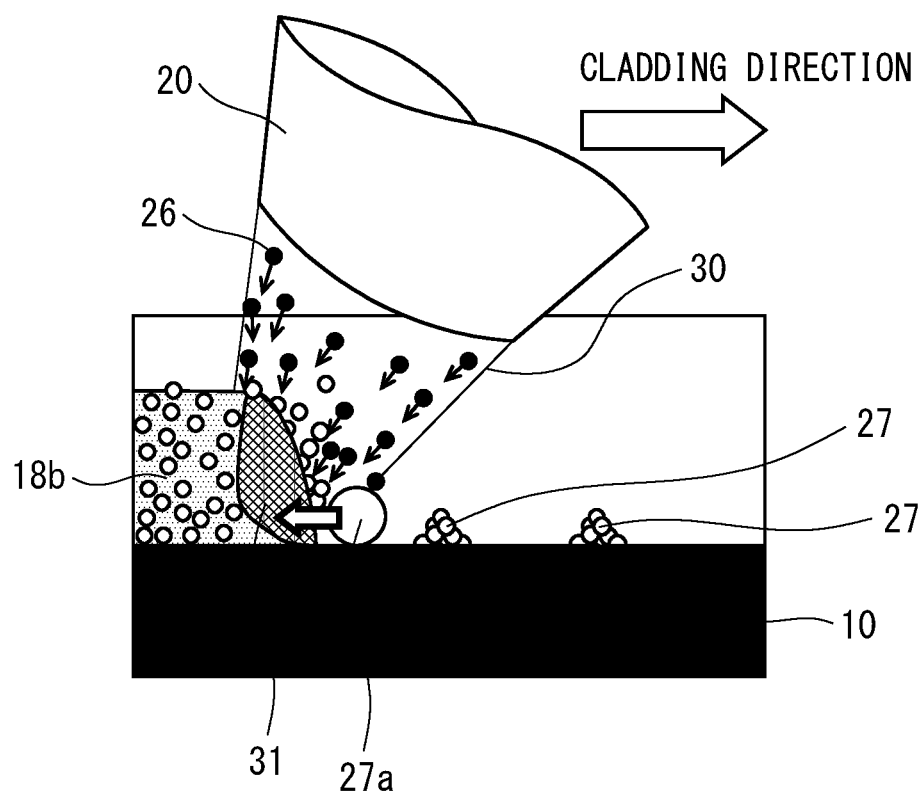
FIG. 10 is a diagram that exemplifies formation of an intermediate part in the laser build-up method according to the modified example of the first embodiment.
Figure 11:
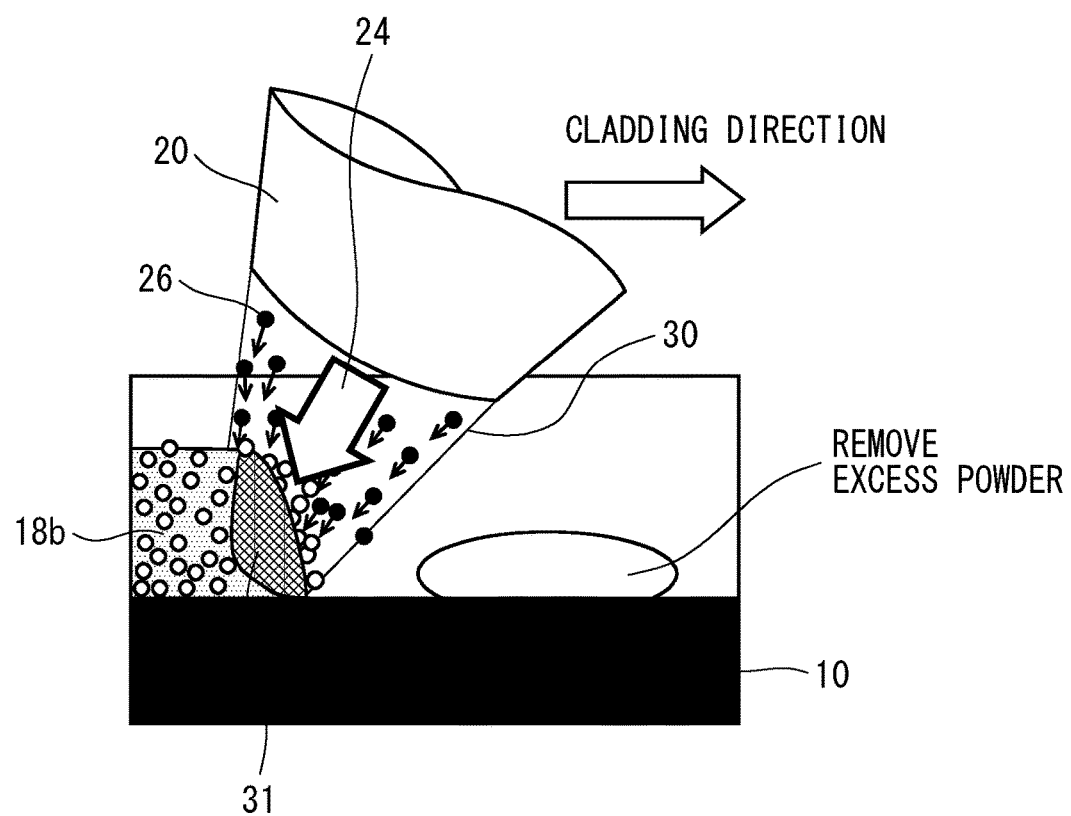
FIG. 11 is a diagram that exemplifies formation of the intermediate part in the laser build-up method according to the modified example of the first embodiment.

FIGS. 10 and 11 are diagrams that exemplify the formation of the intermediate part in the laser build-up method according to the modified example of the first embodiment.

As shown in FIG. 10, the excess powder 27 is generated also when the intermediate part 18b is formed. Therefore, the excess powder 27 is deposited also at the front of the cladding direction of the melt pool 31. The excess powder 27 that has been deposited is heated to become a ball 27a. The ball 27a then falls into the melt pool 31. At this time, the ball 27a entrains gas or the like which causes defects such as the blow holes.

As shown in FIG. 11, by increasing the flow rate of the seal gas 24 in the intermediate part 18b, the excess powder 27 deposited at the front of the cladding direction of the melt pool 31 is removed. It is therefore possible to suppress formation of the ball 27a, whereby the defects such as the blow holes can be reduced.

Figure 12:
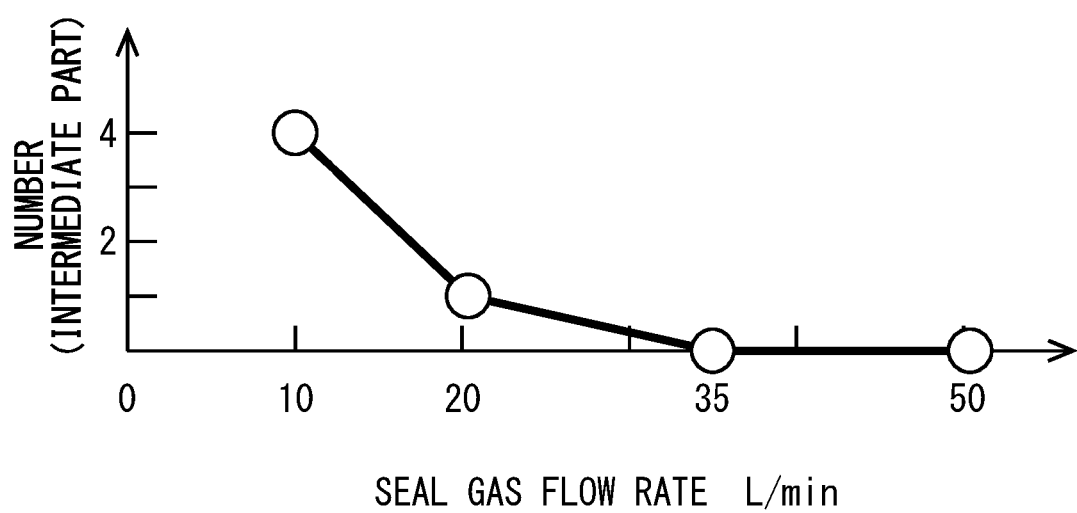
FIG. 12 is a graph that exemplifies effects of an increase in a seal gas flow rate in the laser build-up method according to the modified example of the first embodiment, with a horizontal axis indicating a seal gas flow rate and a vertical axis indicating the number of blow holes in the intermediate part.

FIG. 12 is a graph that exemplifies the effects of the increase in the flow rate of the seal gas in the laser build-up method according to the modified example of the first embodiment, with the horizontal axis indicating the seal gas flow rate and the vertical axis indicating the number of blow holes in the intermediate part 18b.

As shown in FIG. 12, the number of blow holes in the intermediate part 18b decreases as the flow rate of the seal gas 24 is increased. When the flow rate of the seal gas 24 is increased to 20 L/min from 10 L/min, the number of blow holes significantly decreases. The number of blow holes becomes zero when the flow rate of the seal gas 24 is 35 L/min. As stated above, by increasing the flow rate of the seal gas 24, it is possible to remove the excess powder 27 deposited at the front of the cladding direction and to decrease the number of blow holes.

On the other hand, when the flow rate of the seal gas 24 is increased, the yield of the metallic powder 26 decreases. Therefore, the flow rate of the seal gas 24 in the intermediate part 18b which accounts for a large part of the cladding layer 16 and significantly affects the yield of the metallic powder 26 is limited to about 20 L/min where the number of blow holes significantly decreases. The flow rate of the seal gas 24 when the overlapped part 17 including a large amount of excess powder 27 that has been deposited is formed is set to 30 L/min or larger. In this way, according to this embodiment, it is possible to improve the yield of the metallic powder 26 while suppressing the occurrence of the blow holes in the overlapped part 17.

Second Embodiment

Next, a second embodiment will be described. In this embodiment, the flow rate of the seal gas 24 of only the second removal timing 19b in FIG. 6 or FIG. 9 is made larger than the flow rate of the seal gas 24 when the intermediate part 18b is formed. The flow rate of the seal gas 24 in the first removal timing 19a is the same as the flow rate of the seal gas 24 when the intermediate part 18b is formed. Since the configurations other than that are the same as those in the first embodiment, the descriptions thereof will be omitted. In this embodiment, the flow rate of the seal gas 24 in the first removal timing 19a is the same as that of the seal gas 24 when the intermediate part 18b is formed. It is therefore possible to improve the yield of the metallic powder 26 while suppressing the occurrence of the blow holes in the overlapped part 17.

Third Embodiment

Next, a third embodiment will be described. In this embodiment, the bottom surface 15a of the counter sunk groove 15 is inclined.

Figure 13:
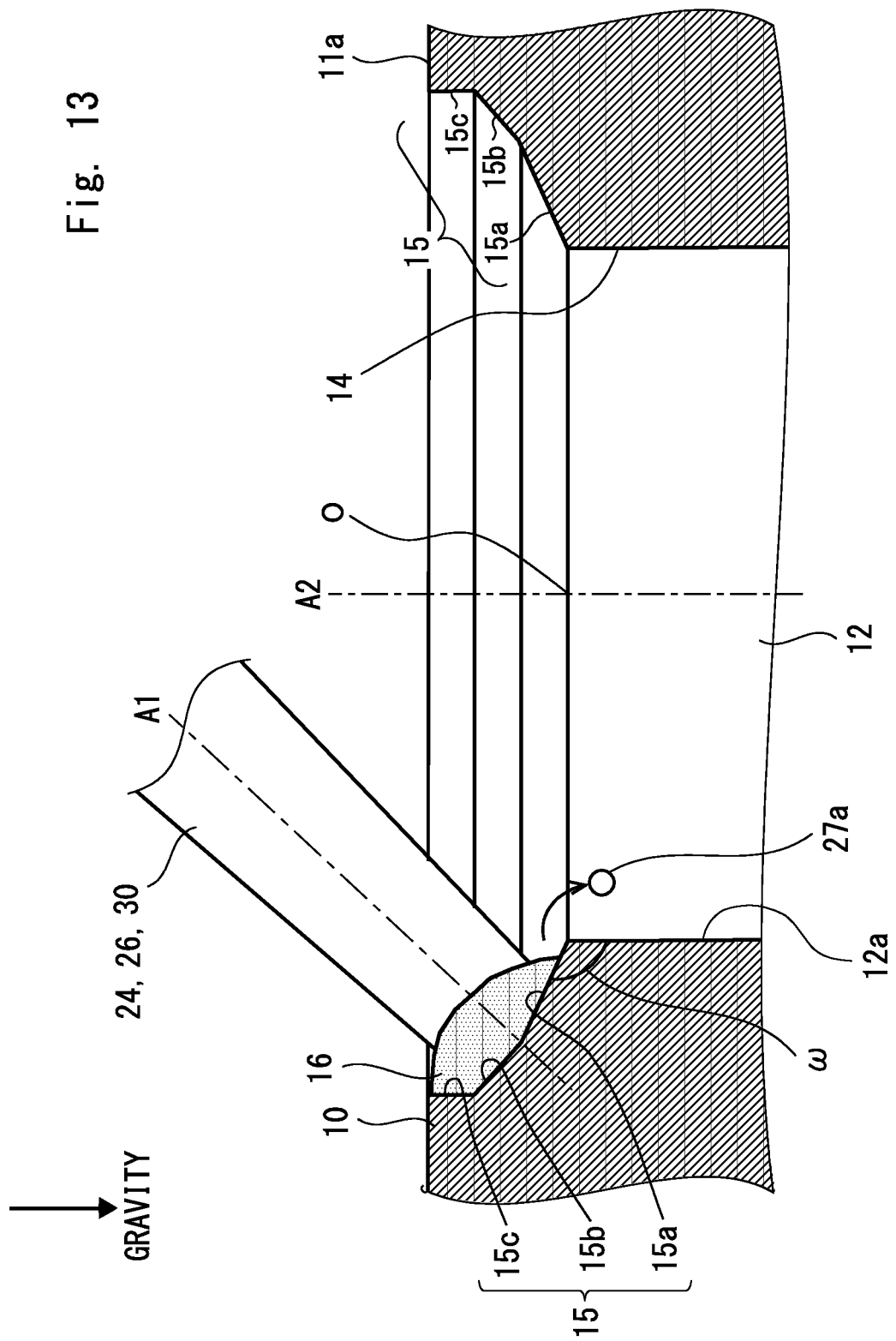
FIG. 13 is a cross-sectional view schematically showing an outline of a laser build-up method according to a third embodiment.

FIG. 13 is a cross-sectional view schematically showing an outline of a laser build-up method according to the third embodiment.

As shown in FIG. 13, the central axis A2 of an annular form of the counter sunk groove 15 is denoted by the vertical direction so that the opening 14 faces upward. In this case, the bottom surface 15a is formed so that the side of the central axis A2 in the bottom surface 15a of the counter sunk groove 15 is inclined downward. The inner peripheral surface 12a of the inlet port 12 is formed to have a cylindrical shape having the central axis A2. Therefore, the bottom surface 15a is inclined to form the counter sunk groove 15 so that an angle ω of the bottom surface 15a of the counter sunk groove 15 and the inner peripheral surface 12a of the inlet port 12 that are adjacent to each other becomes larger than 90°. The bottom surface 15a is formed in such a way that it does not include a horizontal surface that is orthogonal to the central axis A2 when the central axis A2 is the vertical direction.

The cladding layer 16 is formed inside the counter sunk groove 15 thus formed. The central axis A2 of the annular form of the counter sunk groove 15 is the vertical direction so that the opening 14 faces upward. The laser beam 30 is irradiated while the metallic powder 26 is being supplied to the counter sunk groove 15 and the cladding layer 16 for the valve seat is successively formed. In the process of forming the cladding layer 16, the ball 27a is generated, as stated above. In this embodiment, the bottom surface 15a is inclined. Therefore, the ball 27a that is generated is blown off by the seal gas 24 and falls off the counter sunk groove 15. It is therefore possible to suppress the ball 27a from being entrained in the cladding layer 16.

In the laser build-up method according to this embodiment, the bottom surface 15a of the counter sunk groove 15 is inclined such that the angle of the bottom surface 15a of the counter sunk groove 15 and the inner peripheral surface 12a of the port 12 becomes larger than 90°. According to this structure, the excess powder 27 is hardly deposited on the bottom surface 15a. Further, after the excess powder 27 becomes the ball 27a, this ball 27a is easily dropped into the port. It is therefore possible to suppress the occurrence of the blow holes.

While the embodiments of the laser build-up method according to the present invention have been described above, the present invention is not limited to the above configurations and may be changed without departing from the spirit of the present invention.

For example, since the specific numerical values such as the flow rate of the seal gas may vary depending on the conditions, they are not limited to the numerical values shown in the embodiments. Further, the angles of the respective parts in the cladding layer 16 may vary depending on the conditions.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A laser build-up method comprising the processes of:
forming an annular counter sunk groove in an edge of an opening of a port on a side of a combustion chamber in a cylinder head roughly formed material; and
irradiating a laser beam while a metallic powder is being supplied to the counter sunk groove and successively forming a cladding layer for a valve seat, wherein:
the cladding layer is formed while seal gas is being sprayed onto a melt pool,
the cladding layer comprises a starting end part, a part formed just after the starting end part is formed, an intermediate part, a part formed just before a terminating end part is formed, and a terminating end part, which are formed in this order, and the cladding layer is successively formed in an annular shape, and
the flow rate of the seal gas when an overlapped part in which the terminating end part overlaps with the starting end part is formed is made larger than the flow rate of the seal gas when the intermediate part is formed.

2. The laser build-up method according to claim 1, wherein the flow rate of the seal gas when the part formed just before the terminating end part is formed is made larger than the flow rate of the seal gas when the intermediate part is formed.

3. The laser build-up method according to claim 1, wherein the flow rate of the seal gas when the starting end part is formed is made larger than the flow rate of the seal gas when the intermediate part is formed.

4. The laser build-up method according to claim 3, wherein the flow rate of the seal gas when the part formed just after the starting end part is formed is made larger than the flow rate of the seal gas when the intermediate part is formed.

5. The laser build-up method according to claim 1, wherein:
the counter sunk groove is formed by inclining a bottom surface so that the angle of the bottom surface of the counter sunk groove and an inner peripheral surface of the port becomes larger than 90°; and
the cladding layer is successively formed by making a central axis of the counter sunk groove coincide with a vertical direction.

6. The laser build-up method according to claim 1, wherein:
the metallic powder is supplied using a carrier gas; and
the flow rate of the seal gas when the intermediate part is formed is the same as a flow rate of the carrier gas.

* * * * *